United States Patent Office 3,420,691
Patented Jan. 7, 1969

3,420,691
ARTIFICIALLY COLORED MINERAL GRANULES
Patrick H. Thomas, Hagerstown, and Gary R. Holland, Williamsport, Md., assignors to The Ruberoid Co., New York, N.Y., a corporation of New Jersey
No Drawing. Filed May 6, 1966, Ser. No. 548,072
U.S. Cl. 117—62                                  11 Claims
Int. Cl. C04b 31/28

This invention relates to artificially colored granules and, more particularly, to an improved method for applying colored coatings to mineral granules that will substantially eliminate the tendency of the resultant granules to develop haze and to bloom. The term "haze" referred to herein is defined as a visible white efflorescence formed on the surface of the granules when exposed to certain environmental conditions, such as moisture, heat or both. Visible white crystals which develop on the surfaces of the granules after they are exposed to moisture with subsequent freezing, thawing, and evaporating of the condensed water are termed "cold bloom." The artificially colored granules of this invention are particularly suitable as surfacing material to protect the asphalt coatings of sheets, shingles, and sidings of bituminously impregnated and coated felt from the deteriorating action of the weather and to provide a pleasing and decorative surface for asphalts or other substrates.

Two types of processes, low temperature and high temperature processes, are generally used for manufacturing artificially colored granules. In carrying out the low temperature process, preheated, crushed, and graded mineral granules are mixed with an aqueous slurry containing a pigment and sodium silicate to provide color coatings thereon. The coated granules are dried and further dehydrated at below about 600° F. in a rotary kiln. After drying and while the granules are still at a raised temperature of approximately 400° F., an aqueous solution of an acidic pickling compound is applied to the hot granules to complete the insolubilization of the silicate coating. Residual water on the granules is evaporated by the latent heat remaining in the treated granules. A number of acidic pickling compounds may be used for the insolubilization of the silicate coating. Most commonly used are aluminum chloride, ammonium chloride and their mixture.

In the high temperature process, the mineral base granules are similarly coated by mixing with an aqueous slurry of a pigment and sodium silicate. The slurry may also contain an insolubilizing agent, such as acid kaolin clay. Extenders and other insolubilizing agents may also be used. The coated granules are then dried, dehydrated, and insolubilized in a rotary kiln at a temperature range from 800° F. to 1400° F.

In both the low temperature and high temperature processes, the colored granules after cooling are subject to a surface treatment to increase their adhesion to the bituminous material. A conventional treatment is coating the granules with a suitable oil with or without additives.

Heretofore the artificial colored granules produced by either of these two types of processes may tend to develop haze or to bloom when they are exposed to the environmental conditions that are normally encountered during manufacturing and in subsequent storage and use of the resultant granules. The formation of haze on the surfaces of low temperature granules frequently is due to the persence of opaque salts such as sodium chloride, which is a chemical by-product of the insolubilization process. The opaque salt may not always be readily visible when the coated granules are produced because of their distribution, particle size, crystalline structure and other factors. However, when the coated granules are subsequently exposed to varying environmental conditions, the salt distribution on the surface of the granules may be changed and causes recrystallization into larger visible particles. Cold bloom is caused by the formation of carbonate salts when the granules are exposed to the atmosphere containing moisture and carbon dioxide. The combination of freezing and subsequent thawing with evaporation of the water, promotes the formation of the opaque sodium carbonate by the reaction of sodium ions present as, for example, sodium hydroxide, with carbon dioxide absorbed from that available in the atmosphere. Subsequent freezing, thawing and evaporation of the water concentrate the salts on the surface and cause recrystallization into opaque carbonate or other salt crystals.

The efflorescence of the artificially colored granules which manifests itself in the form of haze or bloom are quality deterrents for granule surfaced sheets, shingles, sidings and the like. The existing manufacturing techniques and procedures for the production of colored granules and granule surfaced roofing further enhance the tendency of the granules to develop haze or to bloom. For example, in the manufacture of roofing shingles, the artificially colored granules are applied to the hot and tacky asphalt coating on a continuous web. The web must be cooled prior to cutting into final shape or size of the shingle. Water spray is commonly used to cool the backside of the web and frequently shingles are packed before all the moisture has been evaporated. During storage and in subsequent use of the shingles the environmental conditions may be sufficient for the development of efflorescence. Therefore, colored granules and their surface materials that are found to be satisfactory in the manufacture may undergo a distinct color change later because of non-uniform hazing or blooming during the storage or in actual use which lead to unsightly and nonuniform colored roofs or sidings. Oftentime, light and dark shades of the same colored granule surfaced products may result in different or same bundles of product.

It is therefore, a principal object of this invention to provide a method for manufacturing artificially colored granules which will substantially reduce the tendency of the resultant granules to develop haze or to bloom. The invention is based on the discovery that hydroxy substituted dicarboxylic acid or hydroxy substituted tricarboxylic acid when incorporated in the post treatment will substantially prevent the growth of opaque salt crystals on the surface of the coated granules. This eliminates the problems of efflorescence commonly encountered in colored granules and their surfaced products.

In accordance with the method of this invention for manufacturing artificially colored granules, the mineral granules are initially coated with a coloring composition comprising a pigment and an aqueous alkali silicate. The silicate on the granules is then dehydrated and insolubilized to bond the pigment to the base granules. An organic acid selected from the group consisting of hydroxy substituted dicarboxylic acid and hydroxy substituted tricarboxylic acid is incorporated in the post treatment in an amount sufficient to prevent the growth of opaque salt crystals on the surface of the coated granules.

The exact mechanism in which the hydroxy substituted polycarboxylic acid prevents the development of the haze or the bloom is not yet completely determined. We found that this type of acid is capable of forming a tough transparent film which prevents the orderly growth of opaque salts that normally develop on the surface of artificially colored granules. The film-forming characteristic of the acids and their capability to alter the salt crystal structures are determined and can be demonstrated by applying the film to glass and drying.

Among the hydroxy substituted polycarboxylic acids that can be used in the process of the present invention we found malic acid.

and citric acid:

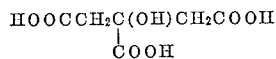

to be eminently suitable. Malic acid, in particular, is found to be most effective in retarding the orderly growth of opaque sodium chloride, a chemical by-product when aluminum chloride or other chloride insolubilizing agent is used in the low temperature process. Malic acid and citric acid are also found to be effective in retarding the orderly growth of other opaque salt crystals such as carbonates, sulfates and phosphates.

The method of this invention has the further advantage that it utilizes the existing low temperature and high temperature processes for manufacturing artificially colored mineral granules with only minor modifications. For example, when the method of this invention is applied to the existing low temperature process in which the coated granules are dehydrated at a temperature below about 600° F. and subsequently insolubilized by an aqueous solution of an insolubilizing agent, such as aluminum chloride, aluminum sulfate, ammonium chloride, sodium nitrate, hydrochloric acid, ferric chloride, and magnesium chloride, the hydroxy substituted polycarboxylic acid may be applied simultaneously and in conjunction with the aqueous insolubilizing solution. Similarly, when the method is applied to the high temperature process, the insolubilized colored granules are preferably cooled to below about 300° F. after which the hydroxy substituted polycarboxylic acid is then applied thereon in an amount sufficient to prevent the growth of opaque salt crystals on the surface of the coated granules. In both processes, each of the resultant colored granules comprise a mineral base granule coated with a pigment bonded in a water resistant and water insoluble silicate matrix.

The amount of hydroxy substituted polycarboxylic acid that is required to retard the development of haze and the formation of bloom in the low and high temperatures processed granules may vary within a wide range depending on the size of the granules, the grade of the silicate, the insolubilizing agent and other process conditions. We find acid in an amount as little as 0.1 pound per ton of granules to be effective. However, in general, for a conventional size 11 granules, the optimum amount is within the range of 0.4 to 0.6 pound per ton. The upper limit does not appear to be critical for high temperature granules. However, using an amount much above one pound of acid per ton of granules does not appear to provide any additional beneficial results, and therefore, has no economic advantage.

For both modified low and high temperature processes, the application of the hydroxy substituted polycarboxylic acid to the coated granules is preferably made at a temperature substantially below the exit temperatures of the heat treated granules from the rotary kiln. The application temperature should be below about 300° F. and preferably in the neighborhood of 250° F. A lower temperature, of course, may also be used, however, the heat retained in the granules may not be sufficient to completely evaporate any residual water.

Suitable base granules can be selected from a wide class of relatively porous or nonporous and weather-resistant rock or mineral. Suitable minerals include trap rocks, slates, argillite, greystone, quartz, quartzite, certain granules or certain synthetic granules made from clay or other ceramics, etc. In general the preferred base granules are derived from relatively non-porous minerals.

In preparing artificially colored granules, using a modified low temperature process of this invention the natural mineral such as greenstone is crushed and screened to desired size, generally to pass a "10 mesh" screen and be retained on a "35 mesh" screen. The screened granules are initially heated to approximately 100–130° F. and then are mixed with an aqueous slurry containing a pigment and sodium silicate in a tumbling barrel type mixer. The amount of sodium silicate and pigment used may be varied depending on the grade of silicate and the pigment or pigments used. Any pigments that are found to be suitable for the existing low temperature processes may be used. Examples of this type of pigment are, red iron oxide, iron oxide yellow, phtholocyanine green paste, chromic oxide, special clay, titanium oxide, etc. In general these pigments may be used alone or in combination. The amount of pigment or pigments used may range from 3 pounds to about 50 pounds per ton of granules.

The preferred grades of sodium silicate have a ratio of $Na_2O$ to $SiO_2$ of 1:2 to 1:3.25. A commercial example of a sodium silicate of this type is the "N" brand sodium silicate currently sold by the Philadelphia Quartz Company which has a ratio of $Na_2O$ to $SiO_2$ of 1:3.22, a gravity of 41° Baumé and a solid content of 37–39 percent. The alkalinity of the silicate may be varied within the range stated above. Increasing the alkalinity generally raises the requirements of the insolubilizer which in some instances appears to be detrimental to the effectiveness of the hydroxy substituted polycarboxylic acid.

After the granules are thoroughly coated in the tumbling barrel mixer, they are predried and then are fired in a rotary kiln at a temperature above 200° F. but usually below about 600° F. for substantially complete dehydration thereof. Subsequent to firing, the granules are cooled to above room temperature, preferably to from 150° to 200° F. or higher in a rotary type cooler. Sufficient water may be used to accelerate the cooling. During the cooling period a solution of an insolubilizing agent containing a hydroxy substituted polycarboxylic acid is applied to the coated hot granules by spraying to insolubilize completely the silicate and to deposit on the surface of the insolubilized silicate a sufficient amount of said hydroxy substituted polycarboxylic acid to prevent the orderly growth of opaque salt crystals. The granules are then cooled and treated with a mineral oil, or other suitable surfacing treatment material to increase their adhesion to the bituminous coating.

In a specific example for manufacturing artificially colored mineral granules according to the modified low temperature process described hereinabove, the screened granules are first preheated to about 130° F. and then are mixed with an aqueous sodium silicate solution (ratio of $Na_2O$ to $SiO_2$ is 1 to 3.25) containing a conventional pigment. The coated granules are predried and fired at a temperature of 500° F. to substantially dehydrate the silicate in a rotary kiln. The exit temperature of the fired granules is approximately 400° F. The fired granules are cooled by water spray to approximately 200° F. During this cooling period a 28 percent aqueous solution of aluminum chloride containing a fixed amount of malic acid is applied to the granules at about 250° F. The relative proportion of malic acid to aluminum chloride used in the process is approximately 1 part of malic acid by weight to 17.5 parts of aluminum chloride. The amount of malic acid solid used is about 0.4 to 0.6 pound per ton of the granules. The resultant granules produced in this example are used in comparative tests as employed in the industry to determine efflorescence in the form of haze and bloom with granules produced in a similar process except that malic acid is not used.

The standard laboratory procedures for producing haze on granules consists of thoroughly wetting 25 grams of sample with 7 mls. of distilled water in a petri dish, drying the sample for one and one-half hours in an oven with a regulated temperature of 230° F. and evaluating the granules for degree of haze developed. In a standard bloom test, 50 grams of sample is wetted with 30 mls. of water in a petri dish and then the wetted sample is exposed to a saturated carbon dioxide atmosphere for 3 hours. After exposing the wetted granules to the CO₂ atmosphere, they are frozen in a freezer for a period of one and one-half hours and subsequently are thawed out in a refrigerator with a regulated temperature of 42° F. and a 30 percent relative humidity. Granules are placed under a fan during thawing period to facilitate evaporation. After the granules are dried, the degree of bloom developed thereon is evaluated.

In comparative tests according to the procedure described above, the granules produced in accordance with the specific examples show very little color change as compared to an undesirable moderate to severe lightening for those produced without the use of malic acid.

We also found that the application of the hydroxy substituted polycarboxylic acid to low temperature processed granules not only reduces the tendency of the granules to develop haze and to bloom but it also decreases the amount of insolubilizing agent required to obtain the same degree of insolubilized silicate film as evaluated by the standard boil test used in the industry. In the specific example described hereinabove, in which malic acid is used, the amount of aluminum chloride required (28 percent aqueous solution of AlCl₃) is reduced from 12 pounds to 7 pounds per ton of granules. The quality of the granules is high and is not impaired by the acid treatment.

For the modified high temperature process of this invention substantially the same modified low temperature process procedure is used with the exceptions that the aqueous alkali silicate solution contains in addition to pigments an insolubilizer such as acid kaolin clay and that the dehydration and insolubilization temperature is much above 600° F., e.g., 800° F. to 1400° F. The hydroxy substituted polycarboxylic acid is similarly applied to the heat treated granules during the cooling period when water is used to cool the granules from approximately 800° F. to 200° F. Of course, no aqueous insolubilizing solution is required.

The artificially colored granules produced by the modified high temperature process of this invention are rated in the standard tests described hereinabove as none in efflorescence as compared to the rating of moderate for the conventional high temperature processed granules without malic acid treatment. Their quality is high and is not impaired by the acid treatment as evaluated according to standard and accepted laboratory procedures.

We claim:
1. A method for manufacturing artificially colored mineral granules which comprises (i) coating the granules with a coloring composition comprising a pigment and an aqueous alkali silicate, (ii) substantially dehydrating the silicate in the coating, (iii) insolubilizing the dehydrated silicate to bond said pigment to said granules, and (iv) applying to the coated granules an organic acid, selected from the group consisting of hydroxy substituted dicarboxylic acids and hydroxy substituted tricarboxylic acids in an amount sufficient to prevent the growth of opaque salt crystals on the surface of the coated granules.

2. A method for manufacturing artificially colored mineral granules which comprises (i) coating the granules with a colored composition comprising a pigment and an aqueous alkali silicate, (ii) heating the coated granules to a temperature below about 600° F. substantially to dehydrate the silicate in the coating, (iii) applying an aqueous solution of an insolubilizing agent to said silicate coating and (iv) applying simultaneously to said coating an organic acid selected from the group consisting of hydroxy substituted dicarboxylic acids and hydroxy substituted tricarboxylic acids in an amount sufficient to prevent the growth of opaque salt crystals on the surface of the coated granules.

3. A method for manufacturing artificially colored mineral granules which comprises (i) coating the granules with a colored compositon comprising a pigment and an aqueous sodium silicate, (ii) heating the coated granules to a temperature below about 600° F. substantially to dehydrate the silicate, (iii) applying an aqueous solution of an insolubilizing agent selected from the group consisting of aluminum chloride, ammonium chloride, hydrochloric acid, aluminum sulfate, aluminum nitrate, ferric chloride, and magnesium chloride to insolubilize the sodium silicate, and (iv) applying simultaneously to said coating an organic acid selected from the group consisting of hydroxy substituted dicarboxylic acids and hydroxy substituted tricarboxylic acids in an amount sufficient to prevent the growth of opaque salt crystals on the surface of the coated granules.

4. A method according to claim 2 wherein said organic acid is malic acid.

5. A method according to claim 2 wherein said organic acid is citric acid.

6. A method for manufacturing artificially colored mineral granules which comprises (i) coating the granules with a coloring composition comprising a pigment, an aqueous alkali silicate and an insolubilizing agent, (ii) substantially dehydrating the silicate, (iii) insolubilizing the dehydrated silicate by heating the dehydrated silicate to a temperature between the range 800°–1400° F. to bond said pigment to the granules, (iv) cooling the heat treated granules to a temperature below about 300° F. and above the room temperature, and (v) applying to the cooled granules an organic acid selected from the group consisting of hydroxy substituted dicarboxylic acids and hydroxy substituted tricarboxylic acids in an amount sufficient to prevent the growth of opaque salt crystals on the surface of the coated granules.

7. The method of claim 6 wherein said organic acid is malic acid.

8. The method according to claim 6 wherein said organic acid is citric acid.

9. Artificially colored granules each comprising a mineral base granule coated with coloring pigment and bonded to the surface of the granule in a water resistant and water insoluble silicate matrix, and on said matrix there is an organic acid selected from the group consisting of hydroxy substituted dicarboxylic acids and hydroxy substituted tricarboxylic acids in an amount sufficient to prevent the growth of opaque salt crystals on the surface of the coated granules.

10. Artificially colored granules according to claim 9 wherein said acid is malic acid.

11. Artificially colored granules according to claim 9 wherein said acid is citric acid.

References Cited

UNITED STATES PATENTS

| | | | |
|---|---|---|---|
| 2,233,358 | 2/1941 | Nutting | 106—308 X |
| 2,943,002 | 6/1960 | Langseth | 117—100 |
| 2,981,635 | 4/1961 | Lodge | 117—100 X |
| 1,991,981 | 2/1935 | Hillers | 117—100 X |

WILLIAM D. MARTIN, Primary Examiner.

M. R. P. CERRONE, Jr., Assistant Examiner.

U.S. Cl. X.R.

106—308; 117—70, 100